United States Patent Office 3,422,453
Patented Jan. 14, 1969

3,422,453
DI-O-BIPHENYLYL DIPHENYL BISPHENOL A
BIS PHOSPHATE AND PROCESS
Arlen W. Frank, Grand Island, N.Y., assignor to Hooker
Chemical Corporation, Niagara Falls, N.Y., a corporation of New York
No Drawing. Filed May 27, 1965, Ser. No. 459,445
U.S. Cl. 260—930                                8 Claims
Int. Cl. C07f 9/12

This invention relates to the preparation of neutral phosphorus-containing esters. More particularly, it relates to a process for the preparation of neutral phosphate and phosphorothionate esters, and to novel compounds produced thereby.

Heretofore, these compounds have generally been produced by the reaction of phenols with phosphorus oxychloride or partially esterified derivatives thereof. These reaction mixtures are highly corrosive, owing to the hydrogen chloride gas evolved, and require the use of glass-lined or alloy kettles. The products generally require purification, as for example by washing with dilute caustic to neutralize any hydrogen chloride, and to hydrolyze and extract traces of partial esterification products.

The invention has as an object a novel method for preparing neutral phosphate and phosphorothionate esters.

Another object is to provide a novel method for preparing neutral phosphate and phosphorothionate esters under conditions which are less corrosive and which do not generate acidic by-products.

A further object is to provide a novel method for the preparation of neutral phosphate and phosphorothionate esters containing different ester groups.

Other objects of the invention will be apparent from the following detailed description.

It has been discovered in accordance with the invention that the objects of the invention can be attained by the transesterification of a phosphorus-containing compound selected from the group consisting of triaryl phosphates and triaryl phosphorothionates, by a transesterifying compound selected from the group consisting of an alcohol and a phenol in the presence of an effective amount of a basic catalyst for the reaction, whereby one or more aryl radicals are displaced from the phosphorus-containing compound as hereinafter described. The phosphorus-containing compounds of this invention are further characterized by the following structural formula:

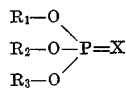

wherein $R_1$, $R_2$ and $R_3$ are independently selected from the group consisting of phenyl and substituted phenyl; alkylaryl and substituted alkylaryl having from 7 to 30 carbon atoms, preferably from 7 to 18 carbon atoms; aryl-phenyl and substituted aryl-phenyl having from 12 to 24 carbon atoms, preferably from 12 to 18 carbon atoms; aralkyl-phenyl and substituted aralkyl-phenyl having from 13 to 25 carbon atoms, preferably from 13 to 19 carbon atoms; and naphthyl and substituted naphthyl; said substituted radicals carrying one or more substituents selected from the group consisting of halogen, nitro-, alkoxy, alkylmercapto, aryloxy, arylmercapto, carbonyl, cyano, and dialkylamino, where alkyl denotes an alkyl radical of from 1 to 12 carbon atoms, preferably from 1 to 6 carbon atoms, and aryl denotes an aryl radical of from 6 to 30 carbon atoms, preferably from 6 to 18 carbon atoms, and said substituent being substantially inert under the reaction conditions employed and hereinafter described; and X is selected from the group consisting of oxygen and sulfur.

Typical examples of these phosphorus-containing compounds are triphenyl phosphate, tri-o-cresyl phosphate, tri-m-cresyl phosphate, tri-p-cresyl phosphate, o-biphenylyl diphenyl phosphate, tri-2,4-xylenyl phosphate, tris(p-nonylphenyl) phosphate, tris(o-chlorophenyl) phosphate, tris-(p-chlorophenyl) phosphate, tris(3-bromophenyl) phosphate, tris(4-iodophenyl) phosphate, tris(m-trifluoromethylphenyl) phosphate, cresyl diphenyl phosphate, bis (p-tert-butylphenyl) phosphate, tri-beta-naphthyl phosphate, triphenyl phosphorothionate, o-biphenylyl diphenyl phosphorothionate, tri-p-cresyl phosphorothionate, phenyl phenylene phosphate, and the like. Mixtures of two or more phosphorus-containing compounds may be employed in place of a single phosphorus-containing compound.

The transesterifying compounds of this invention are further defined as being selected from the group consisting of monohydric, dihydric and polyhydric alcohols having the formula:

$$R_4\text{—(OH)}_n$$

wherein $R_4$ is selected from the group consisting of alkyl and substituted alkyl having from 1 to 30 carbon atoms, the preferred having from 1 to 24 carbon atoms and the most preferred having from 4 to 18 carbon atoms; aralkyl and substituted aralkyl having from 7 to 30 carbon atoms, the preferred having from 7 to 18 carbon atoms; alkenyl and substituted alkenyl having from 2 to 12 carbon atoms, the preferred having from 2 to 6 carbon atoms; said substituted radicals carrying one or more substituents selected from the group consisting of halogen, nitro, alkoxy, alkylmercapto, aryloxy, arylmercapto, carbonyl, cyano and dialkylamino where alkyl denotes an alkyl radical of from 1 to 12 carbon atoms, preferably from 1 to 6 carbon atoms, and aryl denotes an aryl radical of from 6 to 30 carbon atoms, preferably from 6 to 18 carbon atoms, and said substituent being substantially inert under the reaction conditions employed and hereinafter described; and $n$ is from 1 to 6, and monohydric, dihydric and polyhydric phenols having the formula:

$$R_1\text{—(OH)}_n$$

wherein $R_1$ is as previously defined and $n$ is from 1 to 6.

Illustrative examples of the transesterifying compounds which may be employed in the practice of this invention are the following: methanol, ethanol, propanol, isopropanol, butanol, isobutanol, n-hexanol, 2-ethylhexanol, n-octyl alcohol, isooctyl alcohol, nonyl alcohol, decyl alcohol, lauryl alcohol, cetyl alcohol, oleyl alcohol, stearyl alcohol, myricyl alcohol, tetrahydrofurfuryl alcohol, methyl ether of ethylene glycol, ethyl ether of ethylene glycol, butyl ether of ethylene glycol, ethyl ether of diethylene glycol, 2-ethylthioethanol, and 2,2-trichloroethanol; dihydric alcohols, such as ethylene glycol, propylene glycol, and thiodiglycol; polyhydric alcohols, such as trimethylolpropane and pentaerythritol; monohydric phenols, such as phenol, o-cresol, m-cresol, p-cresol, 2,4-xylenol, o-phenylphenol, α-methylbenzylphenol, α-ethylbenzylphenol, o-nitrophenol, p-nitrophenol, p-chlorophenol, nonylphenol, p-tert-butylphenol, and β-naphthol; dihydric phenols, such as resorcinol, hydroquinone, 4,4'-isopropylidenediphenol (Bisphenol A), 4,4'-methylenediphenol (Bisphenol F), 2,4'-ethylidenediphenol and 2,2-bis (4-hydroxyphenol) butane; and polyhydric phenols, such as phloroglucinol. Mixtures of two or more transesterifying compounds may be employed in place of a single transesterifying compound.

The transesterification of orthophosphate esters has been discussed by Van Wazer [Phosphorus and Its Compounds, vol. I, 585 (1958)], who described the rate as being so slow that a number of organic chemists have said that the reaction does not occur, even in fairly acid media. Furthermore, in the alcoholysis of trialkyl phosphates there is a side reaction whereby ethers are formed in rather large quantities. Unexpectedly, when a triaryl phosphate or triaryl phosphorothionate is transesterified in the presence of a basic catalyst, under reaction conditions hereinafter described, the transesterification proceeds readily to substantial completion and the formation of undesired by-products is suppressed. The process of this invention is particularly useful for the preparation of mixed phosphates and phosphorothionates, although it is possible to obtain total transesterification under the reaction conditions of the present invention. The use of neutral organic phosphate esters as plasticizers, gasoline additives and the like is well known to the art. The use of neutral phosphorothionate esters as plasticizers and the like is also known to the art.

The catalysts which may be employed in the practice of this invention are strong bases, such as the alkali metals, the alkali metal hydrides, hydroxides, phenoxides and alkoxides, and alkaline earth metals and their compounds which are sufficiently strong bases. Typical examples of these catalysts are sodium, sodium hydride, sodium hydroxide, sodium methoxide, sodium ethoxide, sodium phenoxide, sodium diphenyl phosphite, sodium dibutyl phosphite, sodium phosphate, lithium, potassium hydroxide, barium hydroxide, and the like.

The preferred phosphorus-containing compounds employed in the practice of this invention are those which contain at least one phenyl substituent, and the most preferred are triphenyl phosphate and triphenyl phosphorothionate. When such phosphates and phosphorothionates are employed, the phenolic by-product of the transesterification is phenol which, in most instances, is readily removed by distillation. It is also within the scope of this invention to remove the phenolic by-product, which may be phenol, by other means, such as extraction and the like. Alternatively, it is also possible to separate the desired neutral phosphate or phosphorothionate ester from the phenolic by-product by means which include distillation, extraction, filtration, and the like.

The preferred transesterifying compounds employed in the practice of this invention are those with boiling points which are higher than the boiling point of the phenolic by-product, thus allowing for the removal of the by-product by distillation. When the by-product is phenol itself, as when triphenyl phosphate or triphenyl phosphorothionate is transesterified, the preferred transesterifying compounds are those with normal boiling points higher than 182 degrees centigrade. However, it is also within the scope of this invention to employ transesterifying compounds which boil below the boiling point of the aromatic by-product, as for example when triphenyl phosphate is transesterified by a low-boiling alcohol.

The preferred alkaline catalysts employed in the practice of this invention are the alkali metals and the alkali metal hydroxides.

The selected phosphorus-containing compound and the transesterifying compound may be brought together in substantially stoichiometric proportions. Thus, 1, 2, or 3 molar proportions of a monohydric transesterifying compound may be employed to transesterify and displace 1, 2, or 3 aryl radicals, respectively, from a triaryl phosphate or triaryl phosphorothionate. When the transesterifying compound is a dihydric alcohol or phenol, 1 molar proportion of the transesterifying compound may be employed to transesterify 2 molar proportions of the phosphorus-containing compound, displacing 1 aryl radical from each compound, thus producing a diphosphate or diphosphorothionate. Alternatively, the dihydric alcohol or phenol may be employed in equimolar proportions with the phosphorus-containing compound, displacing 2 aryl radicals as 2 molar proportions of phenolic by-product and giving neutral phosphorus-containing esters which are cyclic or polymeric. When the transesterifying compound is a polyhydric alcohol or phenol, the molar proportions may be similarly adjusted to give the desired neutral phosphorus-containing ester. When the transesterifying agent is a monohydric, dihydric or polyhydric alcohol, conforming to the formula $R_4$—$(OH)_n$ as previously described, it is preferred to employ a molar proportion which will not displace the third aryl radical in the phosphorus-containing compound. Accordingly, a monohydric alcohol is employed in up to 2 molar proportions.

Sufficient catalyst is introduced to the reaction to provide about 0.001 part to 0.5 part of catalyst per part of phosphorus present in the phosphorus-containing compound. It is preferred to employ 0.005 part to 0.25 part of catalyst, and most preferred to employ 0.001 part to 0.1 part of catalyst on the basis previously mentioned. The amounts are small but effective.

The reaction mixture of transesterifying compound, phosphorus-containing compound and strongly basic catalyst may be prepared in any suitable means adapted for batch operation. The reactants may be introduced in any suitable order, preferably before the application of heat.

The reaction mixture is heated and maintained at a temperature in the range of 80 to 300 degrees centigrade, preferably in the range of 100 to 250 degrees centigrade, and most preferably in the range of 120 to 200 degrees centigrade. In the most preferred embodiments, the temperature ranges are maintained above the boiling point of the phenolic by-product but below the boiling point of the reactants and of the desired reaction product.

Generally, sub-atmospheric pressures are most suitably employed. However, it is within the scope of the invention to utilize atmospheric or super-atmospheric pressures. The reaction time varies with the nature of the reactants, the temperature, the pressure and the products desired. Completion of the reaction is generally effected in about 1 to about 12 hours.

After the reaction is completed or preferably while the reaction is progressing, the aromatic by-product is distilled off, if it has a boiling point lower than the reactants and the desired reaction product. If the desired reaction product has the lower boiling point, it may be recovered as indicated above. When the desired reaction product is recovered in the pot residue, separation may be effected by any suitable means, such as crystallization, filtration, distillation and the like. Because of the high yields which are obtainable in many cases, as when the by-product is distilled off, further separation or purification of the desired neutral phosphate or phosphorothionate ester from the reaction mixture is not always required for utility of the product.

The following examples illustrate the process of the invention; however, they are not to be construed as limiting the invention except as defined in the appended claims. All temperatures are in degrees centigrade and all parts are by weight, unless otherwise mentioned.

EXAMPLE 1

A reaction vessel was charged with 81.5 parts of triphenyl phosphate and 42.5 parts of o-phenylphenol, with stirring until the mixture was an almost homogeneous liquid. Thereafter, 0.25 part of sodium was added, heat applied, and the pressure reduced to 10 millimeters of mercury absolute pressure. At about 130 degrees centigrade the sodium dissolved and phenol began to distill. Heating was continued and phenol stripped off over a four hour period to a maximum pot temperature of 180 degrees centigrade and 10 millimeters of mercury absolute pressure. A total of 22.4 parts of phenol was collected in the receiver. The pot residue was filtered through a sintered glass filter while still warm, giving 102 parts of o-biphenylyl diphenyl phosphate as a clear yellow viscous liquid with a refractive index ($n_D^{20}$) of 1.5995 and a density ($d_4^{20}$) of 1.2896. The product was found to contain 7.61 percent of phosphorus, and its acidity was nil. The calculated percentage of phosphorus in $C_{24}H_{19}O_4P$ is 7.71 percent.

A portion of this product was dissolved in methylene chloride, washed with dilute caustic and then with water, and stripped of solvent. It was unchanged in appearance of analysis (found: 7.60 percent phosphorus, acidity nil). This treatment was clearly unnecessary, indicating that the product was neutral.

EXAMPLE 2

This example illustrates the transesterification of phosphates other than triphenyl phosphate.

To a reaction vessel were added 92.0 parts of tri-p-cresyl phosphate and 42.5 parts of o-phenylphenol, with stirring. Thereafter, 0.5 part of sodium hydroxide was added, heat applied, and the pressure adjusted to 10 millimeters absolute. At about 130 degrees centigrade p-cresol began to distill. Heating was continued and p-cresol stripped off over a one hour period to a maximum pot temperature of 180 degrees centigrade and 10 millimeters of mercury absolute pressure. A total of 24.6 parts of p-cresol was collected in the receiver. The product, o-biphenylyl di-p-cresyl phosphate,

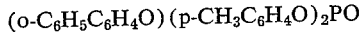

$$(o\text{-}C_6H_5C_6H_4O)(p\text{-}CH_3C_6H_4O)_2PO$$

was obtained as a straw-colored oil in 99 percent yield. The calculated percentage of phosphorus in $C_{26}H_{33}O_4P$ is 7.21 percent. The product was found to contain 7.15 percent of phosphorus, and its acidity was nil.

EXAMPLE 3

This example illustrates the preparation of a neutral phosphate ester with three different ester groups.

To a reaction vessel were added 40.2 parts of o-biphenylyl diphenyl phosphate, prepared as described in Example 1, and 11.4 parts of Bisphenol A (4,4'-isopropylidenediphenol). Thereafter, 0.17 part of sodium hydroxide was added, heat applied, and the pressure reduced to 10 millimeters of mercury absolute pressure. Phenol began to distill at about 123 degrees centigrade. Heating was continued and phenol stripped off over a one hour period to a maximum pot temperature of 180 degrees centigrade at 10 millimeters of absolute pressure. A total of 9.3 parts (99 percent yield) of phenol was recovered, melting at 36–39 degrees centigrade and shown to be free of o-phenylphenol by an inspection of its infrared spectrum. The product, symmetrical di-o-biphenylyl diphenyl Bisphenol A bis(phosphate), was obtained as a very viscous, straw-colored oil. Its structure was as follows:

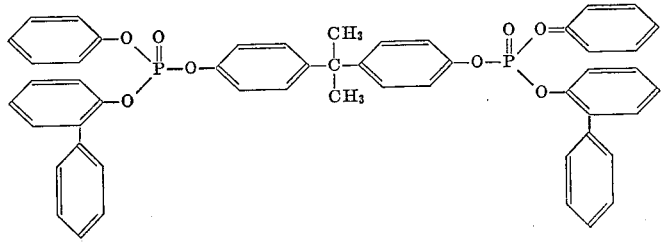

The product was found to contain 7.20 percent of phosphorus. The calculated percentage of the element in $C_{51}H_{42}O_8P_2$ is 7.34 percent of phosphorus. When symmetrical di-o-biphenylyl diphenyl Bisphenol A bis(phosphate), structurally characterized above, is employed in effective amounts as a plasticizer for plastic or elastomeric compositions, substantial increases in the flexibility, extensibility and impact resistance of said compositions are obtained.

EXAMPLE 4

To a reaction vessel were added 81.5 parts of triphenyl phosphate and 27.0 parts of p-cresol, with stirring. Thereafter, 0.4 part of sodium hydroxide was added, heat applied, and the pressure reduced to 10 millimeters of absolute pressure. At about 115 degrees centigrade the phenol began to distill. Heating was continued and phenol stripped off over a two hour period to a maximum pot temperature of 180 degrees centigrade and 10 millimeters of mercury absolute pressure. The product was then distilled giving 70.5 parts (83 percent yield) of diphenyl p-cresyl phosphate $(C_6H_5O)_2(p\text{-}CH_3C_6H_4O)PO$, boiling point 203–205 degrees centigrade at 0.15 millimeter of mercury absolute pressure, $n_D^{24}$ 1.5619, as a viscous, colorless oil. The product was found to contain 9.09 percent of phosphorus. The calculated percentage of the element in $C_{19}H_{17}O_4P$ is 9.12 percent of phosphorus.

EXAMPLE 5

Employing the procedure of Example 4, 81.5 parts of triphenyl phosphate, 34.8 parts of p-nitrophenol, and 0.4 part of sodium hydroxide were reacted together, giving 28.0 parts (30 percent yield) of diphenyl p-nitrophenyl phosphate $(C_6H_5O)_2(p\text{-}NO_2C_6H_4O)PO$, as a viscous yellow oil, boiling point 215–220 degrees centigrade at 0.15 millimeter mercury absolute pressure, $n_D^{25}$ 1.5791, which crystallized on standing to a yellow solid, melting point 48.5–50 degrees centigrade after recrystallization from a mixture of diethyl ether and petroleum ether. The product was found to contain 3.48 percent nitrogen and 7.84 percent phosphorus. The calculated percentages of these elements in $C_{18}H_{14}NO_6P$ are 3.77 percent nitrogen and 8.35 percent phosphorus.

EXAMPLE 6

Employing the procedure of Example 4, 97.8 parts of triphenyl phosphate, 34.2 parts of Bisphenol A (4,4'-isopropylidenediphenol), and 0.3 part of sodium were reacted together giving 105.5 parts (100 percent yield) of tetraphenyl Bisphenol A bis(phosphate),

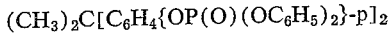

$$(CH_3)_2C[C_6H_4\{OP(O)(OC_6H_5)_2\}\text{-}p]_2$$

as a pale yellow viscous oil. The calculated percentages of carbon, hydrogen and phosphorus in the product $(C_{39}H_{34}O_8P_2)$ are 67.63 percent carbon, 4.95 percent hydrogen and 8.95 percent phosphorus. The amounts found were 67.70 percent carbon, 5.06 percent hydrogen, and 9.03 percent phosphorus.

EXAMPLE 7

This example illustrates the displacement of two of the aryl groups in a triaryl phosphate.

To a reaction vessel were added 32.6 parts of triphenyl phosphate and 34.0 parts of o-phenylphenol with stirring until the mixture was an almost homogeneous liquid. Thereafter, 0.1 part of sodium was added, heat applied and the pressure adjusted to 10 millimeters of absolute pressure. At about 116 degrees centigrade the sodium dissolved and phenol began to distill. Heating was continued and phenol stripped off over a 1.5 hour period to a maximum pot temperature of 180 degrees centigrade and 10 millimeters of mercury absolute pressure. The pot contents were allowed to cool, and were then filtered through a sintered glass filter, giving 48.7 parts of di-o-biphenylyl phenyl phosphate $(o\text{-}C_6H_5C_6H_4O)_2(C_6H_5O)PO$, as a viscous brown liquid with a density ($d_4^{60}$) of 1.2933. The product was found to contain 6.46 percent of phosphorus, and its acidity was nil. The calculated percentage of phosphorus in $C_{30}H_{23}O_4P$ is 6.48 percent phosphorus. The product was readily distinguishable from o-biphenylyl diphenyl phosphate, the product of Example 1, by the different intensities of the $C_6H_5O$ and $o$-$C_6H_5C_6H_4O$ bands in their infrared spectra at 14.4 and 14.2, respectively.

EXAMPLE 8

This example illustrates the displacement of all three of the aryl groups in a triaryl phosphate.

Employing the apparatus and procedure of Example 7, 48.9 parts of triphenyl phosphate were caused to react with 85.0 parts of o-phenylphenol and 0.15 part of sodium. The product was a viscous brown oil, containing 5.72 parts of phosphorus and no acidity. Its infrared spectrum showed a trace of PhO absorption at 14.4μ. To drive out the remainder of the phenol, the product was mixed with more o-phenylphenol (51.0 parts) and sodium (0.15 part) and distilled at 180 degrees centigrade and 3 millimeters of mercury absolute pressure until all of the phenol and the excess o-phenylphenol were removed. The product was a crystalline solid which melted at 97–98 degrees centigrade after recrystallization from ethanol, and showed no trace of PhO absorption in the infrared at 14.4μ. The product, tri-o-biphenylyl phosphate, $(o$-$C_6H_5C_6H_4O)_3PO$, analyzed 78.03 percent carbon, 5.09 percent hydrogen and 5.49 and 5.60 percent phosphorus. The calculated percentages of these elements in $C_{36}H_{27}O_4P$ are 77.96 percent carbon, 4.91 percent hydrogen, and 5.59 percent phosphorus.

The product was soluble in chloroform, benzene, dioxane and tetrahydrofuran, and insoluble in acetone, methanol, carbon tetrachloride and hexane. Its melting point was unchanged by further recrystallization from ethanol, methanol, acetone or hexane.

EXAMPLES 9 TO 27

These examples illustrate the effect of replacing sodium by other catalysts.

To a reaction vessel equipped with a magnetic stirrer, a thermometer, a Vigreux column and a distillation set-up were added 9.78 parts of triphenyl phosphate, 15.3 parts of o-phenylphenol and 0.1 part of the catalyst. The mixture was heated at 10 millimeters of mercury absolute pressure until some liquid distilled, and the distillate was checked for phenol. The distillates which were liquid or low-melting were assumed to contain phenol, and were, therefore, not examined further. However, those which melted in the vicinity of o-phenylphenol, which melts at 56–57 degrees centigrade, were analyzed for phenol by infrared, using the phenol band at 11.3μ. The pot temperature at the beginning of distillation was also noted. The catalysts employed and the results obtained are given in Table I.

TABLE I.—CATALYSTS FOR TRANSESTERIFICATION

| Ex. | Catalyst | Pot temperature at start of distillation (°C.) | Distillate melting point (°C.) | Percent phenol |
|---|---|---|---|---|
| 9 | Sodium hydride | 109 | 28–34 | |
| 10 | Sodium hydroxide | 116 | 33–39 | |
| 11 | Sodium methoxide | 122 | Soft | |
| 12 | Sodium phenoxide | 129 | 25–35 | 91 |
| 13 | Sodium phosphate (Na$_3$PO$_4$.12 H$_2$O) | 145 | 25–38 | |
| 14 | Sodium diphenyl phosphite | 140 | 25–33 | |
| 15 | Sodium dibutyl phosphite | 137 | 25–35 | |
| 16 | Lithium hydroxide | 134 | Semisolid | 76 |
| 17 | Potassium hydroxide | 130 | 27–39 | |
| 18 | Barium hydroxide (Ba(OH)$_2$.8 H$_2$O) | 135 | Semisolid | 73 |

The following compounds were found to be ineffective:

| Ex. | Catalyst | Pot temperature at start of distillation (°C.) | Distillate melting point (°C.) | Percent phenol |
|---|---|---|---|---|
| 19 | Triphenyl phosphite | 148 | 55.5–57 | Nil |
| 20 | Diphenyl phosphite | 147 | 40–56 | 4.5 |
| 21 | Dibutyl phosphite | 167 | 51–56 | Nil |
| 22 | Magnesium powder | 151 | 51–55 | Nil |
| 23 | Aluminum oxide | 143 | 57–58 | Nil |
| 24 | Aluminum trichloride | 143 | 56–57 | Nil |
| 25 | Titanium tetrachloride | 140 | 56–57.5 | Nil |
| 26 | Phosphoric acid | 148 | 56–57.5 | Nil |
| 27 | Sulfuric acid | 146 | 56–57.5 | Nil |

EXAMPLE 28

A reaction vessel was charged with 65.2 parts of triphenyl phosphate and 14.8 parts of butanol, stirred with warming until the contents dissolved, and then charged with 0.2 part of sodium. The mixture was heated to reflux, and maintained at reflux until the pot contents attained a maximum temperature of 158 degrees centigrade (1.5 hours), and held at 158 degrees centigrade for 30 minutes thereafter. The reaction mixture was then distilled, giving 26.0 parts (42.5 percent yield) of butyl diphenyl phosphate, boiling point 162–165 degrees centigrade at 0.1 millimeter of mercury absolute pressure, $n_D^{25}$ 1.5231. The product was found to contain 10.1 percent phosphorus. The calculated percentage of phosphorus in $C_{16}H_{19}O_4P$ is 10.1 percent of phosphorus. The presence of both aromatic and aliphatic ester groups in the product was further established by the presence of absorption bands in its infrared spectrum at 7.8μ. (P=O), 8.4μ (P—OC$_6$H$_5$), 10.4μ (P—OC$_6$H$_5$) and 9.7μ (P—O-alkyl).

EXAMPLE 29

Following the procedure of Example 28, the reaction of 130.4 parts of triphenyl phosphate, 41.1 parts of n-hexanol and 0.4 part of sodium gave an 84 percent yield of diphenyl n-hexyl phosphate, boiling point 171–176 degrees centigrade at 0.025 millimeter of mercury absolute pressure, $n_D^{25}$ 1.5271. The calculated phosphorus content of $C_{18}H_{23}O_4P$ is 92.7 parts. The product was found to contain 8.96 parts of phosphorus.

EXAMPLE 30

To a reaction vessel were added 65.2 parts of triphenyl phosphate and 54.0 parts of stearyl alcohol, with stirring and warming. At 50 degrees centigrade, 0.2 part of sodium was added, the pressure was adjusted to 10 millimeters absolute, and heat was applied. Phenol was stripped off over a one hour period, to a final pot temperature of 180 degrees centigrade and 10 millimeters of absolute pressure. The pot contents were then cooled, slurried in 250 parts of isopropanol, and filtered. The filtrate, on evaporation, yielded 104.8 parts of diphenyl stearyl phosphate as a low-melting solid. The product was found to contain 6.04 percent phosphorus, and a trace of acidity. The calculated phosphorus content of $C_{30}H_{47}O_4P$ is 6.18 percent.

EXAMPLE 31

To a reaction vessel were added 102.6 parts of triphenyl phosphorothionate $(C_6H_5O)_3PS$, and 34.2 parts of Bisphenol A (4,4'-isopropylidenediphenol), with stirring. Thereafter, 0.3 part of sodium was added, heat applied, and the pressure reduced to 10 millimeters of mercury absolute pressure. At about 130 degrees centigrade the sodium dissolved, and at about 170 degrees centigrade phenol began to distill. Heating was continued and phenol stripped off over a four hour period to a maximum pot temperature of 180 degrees centigrade and 10 millimeters of mercury absolute pressure. A total of 27.8 parts of phenol, melting at 35–38 degrees centigrade was collected in the receiver. The product, tetraphenyl Bisphenol A bis(phosphorothionate), was recovered as 110.1 parts of pale green, viscous oil, containing 8.27 parts of phosphorus, 8.84 parts of sulfur, and no acidity. The calculated percentages of these elements in $C_{39}H_{34}O_6P_2S_2$ are 8.56 percent of phosphorus and 8.84 percent of sulfur. The infrared spectrum of this product was similar in many respects to that of tetraphenyl Bisphenol A bis(phosphate), the product of Example 6, but lacked the P=O band at 7.7μ. The structure of the new compound is as follows:

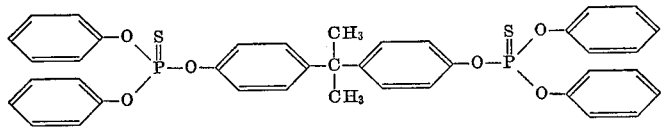

When tetraphenyl Bisphenol A bis(phosphorothionate), structurally characterized above, is incorporated into plastic or elastomeric compositions, substantial increases in the flexibility, extensibility and impact resistance of said compositions are obtained.

EXAMPLE 32

Following the procedure of Example 1, diphenyl α-methylbenzylphenyl phosphate was prepared by the reaction of triphenyl phosphate with α-methylbenzylphenol and sodium catalyst, and isolated as a residue product after removal of the liberated phenol.

What is claimed is:
1.

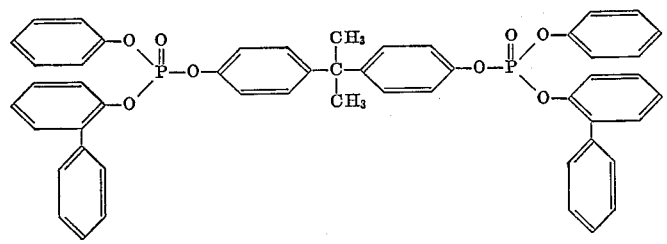

2. A process for preparing a neutral phosphorus-containing ester which comprises transesterifying at least 1 aryl radical of a phosphorus-containing compound selected from the group consisting of triaryl phosphates and triaryl phosphorothionates, wherein the aryl groups are independently selected from the group consisting of phenyl, naphthyl, alkylaryl having 7 to 30 carbon atoms, aryl-phenyl of 12 to 24 carbon atoms, arylalkyl-phenyl of 13 to 25 carbon atoms, and substituted forms of such aryls wherein the substituents are selected from the group consisting of chlorine, bromine, iodine and fluorine, with a transesterifying compound which is a monohydric compound selected from the group consisting of alkanols of 1 to 30 carbon atoms, arylalkanols of 7 to 30 carbon atoms, and alkanols of 2 to 12 carbon atoms, and substituted alkanols, wherein the substituent is lower alkoxyphenyl, and substituted phenol wherein the substituents are selected from the group consisting of lower alkyl, phenyl, benzyl, nitro and chlorine, in the presence of an effective amount, from 0.001 part to 0.5 part per part of phosphorus in the phosphorus-containing reactant, of a strongly basic catalyst for the reaction, at a temperature within the range of about 80° to about 300° C., and recovering a neutral phosphorus-containing ester.

3. A process according to claim 2, wherein the aryl groups of the triaryl phosphates and triaryl phosphorothionates are independently selected from the group consisting of phenyl, naphthyl, alkyl-aryl of 7 to 18 carbon atoms, aryl-phenyl of 12 to 18 carbon atoms, aralkyl-phenyl of 13 to 19 carbon atoms, and substituted forms of such aryls wherein the substituents are selected from the group consisting of chlorine, bromine, iodine and fluorine, the transesterifying compound is selected from the group consisting of alkanols of 4 to 18 carbon atoms, arylalkanols of 7 to 18 carbon atoms, and alkenols of 2 to 6 carbon atoms, substituted alkanols wherein the substituent is lower alkoxy phenyl, and substituted phenol wherein the substituents are selected from the group consisting of lower alkyl, phenyl, benzyl, nitro and chlorine, and the temperature of the reaction is from 100 to 250° C.

4. A process according to claim 3 wherein the strongly basic catalyst for the reaction is selected from the group consisting of alkali metal hydride, alkali metal hydroxide, alkali metal alkoxide, alkali metal phenoxide, alkali metal phosphate, alkali metal diphenyl phosphite, and alkali metal dialkylphosphite.

5. A process according to claim 4 wherein the transesterifying monohydric compound is an alkanol.

6. A process in accordance with claim 4 wherein the transesterifying monohydric compound is a substituted phenol.

7. A process in accordance with claim 4 wherein the phosphorus-containing compound is triphenylphosphate.

8. A process in accordance with claim 4 wherein the phosphorus-containing compound is triphenylphosphorothionate.

References Cited

UNITED STATES PATENTS

| | | | |
|---|---|---|---|
| 2,520,090 | 8/1950 | Barrett | 260—930 |
| 2,728,790 | 12/1955 | Sroog | 260—982 |
| 2,970,166 | 1/1961 | Rosin et al. | 260—982 |
| 3,101,363 | 8/1963 | Baranauckas et al. | 260—982 |
| 3,239,464 | 3/1966 | Matson et al. | 260—930 XR |

CHARLES B. PARKER, *Primary Examiner.*

A. H. SUTTO, *Assistant Examiner.*

U.S. Cl. X.R.

44—76; 260—30.6, 346.1, 347.2, 982

UNITED STATES PATENT OFFICE
CERTIFICATE OF CORRECTION

Patent No. 3,422,453      Dated January 14, 1969

Inventor(s) Arlen W. Frank

It is certified that error appears in the above-identified patent and that said Letters Patent are hereby corrected as shown below:

The formula in Column 5, line 50 should be corrected to read as follows:

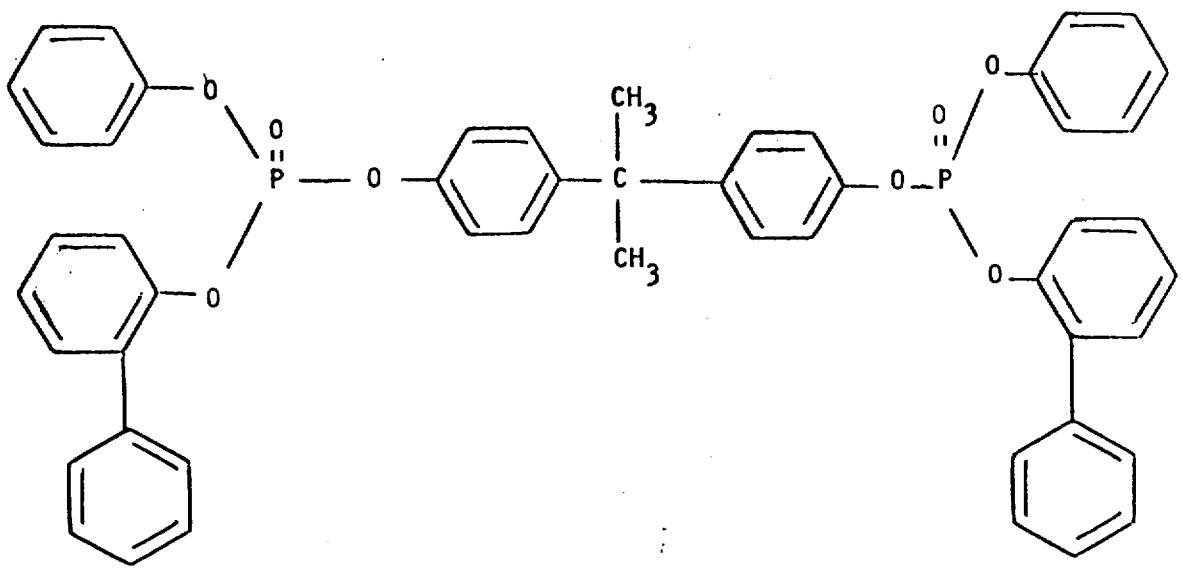

Column 9, line 58 delete "alkanols" and substitute ---alkenols---.

SIGNED AND
SEALED
FEB 24 1970

(SEAL)
Attest:

WILLIAM E. SCHUYLER, JR.
Commissioner of Patents